US009172974B2

(12) United States Patent
Lim et al.

(10) Patent No.: US 9,172,974 B2
(45) Date of Patent: Oct. 27, 2015

(54) APPARATUS AND METHOD OF COMPRESSING AND RESTORING IMAGE USING FILTER INFORMATION

(75) Inventors: Il Soon Lim, Hongseong-gun (KR); Ho Cheon Wey, Seongnam-si (KR); Seok Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 454 days.

(21) Appl. No.: 12/926,233

(22) Filed: Nov. 3, 2010

(65) Prior Publication Data

US 2011/0103702 A1 May 5, 2011

(30) Foreign Application Priority Data

Nov. 4, 2009 (KR) .................. 10-2009-0105922

(51) Int. Cl.
*H04N 19/59* (2014.01)
*H04N 19/176* (2014.01)
*H04N 19/46* (2014.01)
*H04N 19/134* (2014.01)
*H04N 19/177* (2014.01)
*H04N 19/14* (2014.01)
*H04N 19/587* (2014.01)

(52) U.S. Cl.
CPC ............. *H04N 19/59* (2014.11); *H04N 19/134* (2014.11); *H04N 19/14* (2014.11); *H04N 19/176* (2014.11); *H04N 19/177* (2014.11); *H04N 19/46* (2014.11); *H04N 19/587* (2014.11)

(58) Field of Classification Search
CPC .............. H04N 7/26888; H04N 19/59; H04N 19/00278; H04N 7/26688; H04N 7/68; H04N 7/26771; H04N 19/00751; H04N 19/00763; H04N 19/00781; H04N 19/00066; H04N 19/00757; H04N 5/144; H04N 5/9264; H04N 7/26313; H04N 7/02
See application file for complete search history.

(56) References Cited

U.S. PATENT DOCUMENTS

| 5,418,714 A * | 5/1995 | Sarver ........................... 600/407 |
| 5,761,341 A * | 6/1998 | Go .................................. 382/232 |
| 6,385,245 B1 * | 5/2002 | De Haan et al. ......... 375/240.16 |
| 6,574,370 B1 * | 6/2003 | Kazayama et al. ........... 382/236 |
| 6,731,800 B1 * | 5/2004 | Barthel et al. ................ 382/176 |

(Continued)

FOREIGN PATENT DOCUMENTS

| EP | 1962513 A1 | 8/2008 |
| KR | 10-2008-0038533 | 5/2008 |

(Continued)

OTHER PUBLICATIONS

Extended European Search Report mailed Dec. 17, 2010 for corresponding European Application No. 10189950.8, 12 pp.

(Continued)

*Primary Examiner* — Jingge Wu
(74) *Attorney, Agent, or Firm* — NSIP Law

(57) ABSTRACT

Provided is method and apparatus of compressing and restoring an image using filter information. The image compression apparatus may generate a reduced image by sampling an input image, determine filter information based on the input image and a decoded reduced image, and code the filter information and the decoded reduced image. Accordingly, a deterioration in an image quality may be prevented in transmitting the image using a limited bandwidth.

14 Claims, 12 Drawing Sheets

(56) References Cited

U.S. PATENT DOCUMENTS

| | | | |
|---|---|---|---|
| 6,738,169 B1* | 5/2004 | Nakase | 358/539 |
| 7,127,118 B2* | 10/2006 | Burke | 382/242 |
| 7,349,473 B2* | 3/2008 | Hallapuro et al. | 375/240.12 |
| 7,499,492 B1 | 3/2009 | Ameres et al. | |
| 7,773,821 B2* | 8/2010 | Yamamoto | 382/243 |
| 2003/0044064 A1* | 3/2003 | Obrador | 382/166 |
| 2003/0138152 A1* | 7/2003 | Fenney | 382/240 |
| 2003/0169931 A1* | 9/2003 | Lainema | 382/236 |
| 2004/0062307 A1* | 4/2004 | Hallapuro et al. | 375/240.13 |
| 2004/0066251 A1 | 4/2004 | Eleftheriades et al. | |
| 2005/0200757 A1 | 9/2005 | Pica et al. | |
| 2006/0251330 A1* | 11/2006 | Toth et al. | 382/236 |
| 2008/0075165 A1* | 3/2008 | Ugur et al. | 375/240.12 |
| 2008/0199156 A1* | 8/2008 | Uchiike et al. | 386/124 |
| 2008/0204327 A1 | 8/2008 | Lee et al. | |
| 2008/0240592 A1* | 10/2008 | Lee et al. | 382/238 |
| 2008/0247467 A1* | 10/2008 | Rusanovskyy et al. | 375/240.16 |
| 2009/0033558 A1 | 2/2009 | Chung | |
| 2009/0110063 A1* | 4/2009 | Nakayama | 375/240.03 |
| 2009/0135087 A1 | 5/2009 | Gummalla et al. | |
| 2010/0027686 A1* | 2/2010 | Zuo et al. | 375/240.29 |
| 2010/0053451 A1* | 3/2010 | Seong et al. | 348/699 |
| 2010/0074518 A1* | 3/2010 | Tanizawa et al. | 382/166 |
| 2010/0080291 A1* | 4/2010 | Yamamoto et al. | 375/240.12 |
| 2010/0241920 A1* | 9/2010 | Nonogaki | 714/752 |
| 2011/0188578 A1* | 8/2011 | Poullaouec et al. | 375/240.16 |

FOREIGN PATENT DOCUMENTS

| | | |
|---|---|---|
| KR | 10-2008-0072974 | 8/2008 |
| KR | 10-2008-0099291 | 11/2008 |
| KR | 10-2009-0020560 | 2/2009 |
| KR | 10-2009-0022024 | 3/2009 |
| KR | 10-2009-0055002 | 6/2009 |
| WO | 2008/075247 A1 | 6/2008 |

OTHER PUBLICATIONS

Ling Shao et al., "Coding Artifacts Robust Resolution Up-conversion", Image Processing, IEEE, ICIP 2007, Sep. 1, 2007, pp. V-409 through V-412, XP031158572, ISBN: 978-1-4244-1436-9.

Steffen Wittman et al., "Transmission of Post-Filter Hints for Video Coding Schemes", Image Processing, ICIP 2007, Sep. 1, 2007, pp. 1-81 through 1-84, XP031157683, ISBN: 978-1-4244-1436-9.

* cited by examiner

FIG. 4
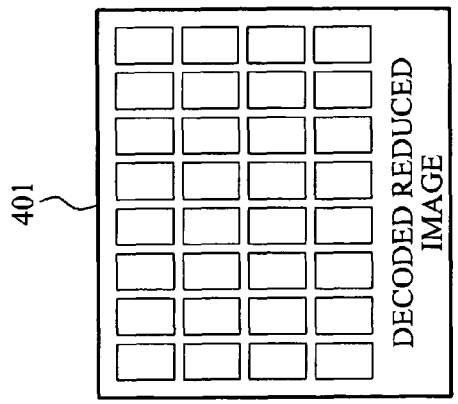
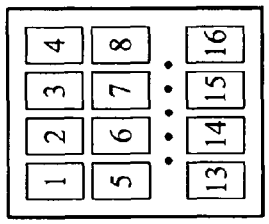

APPARATUS AND METHOD OF COMPRESSING AND RESTORING IMAGE USING FILTER INFORMATION

CROSS-REFERENCE TO RELATED APPLICATIONS

This application claims the priority benefit of Korean Patent Application No. 10-2009-0105922, filed on Nov. 4, 2009, in the Korean Intellectual Property Office, the disclosure of which is incorporated herein by reference.

BACKGROUND

1. Field

One or more embodiments relate to an apparatus and method of creating, compressing, transmitting, and displaying an image that may be applicable to a mobile environment of displaying images.

2. Description of the Related Art

A wide bandwidth may be used to transmit a high resolution image. When the high resolution image is transmitted using a limited bandwidth, the high resolution image may be transformed to a low definition image. When the high resolution image is transformed to the low definition image, an image quality may be deteriorated.

Accordingly, there is a need for an image compression method and an image restoration method that may use a limited bandwidth and prevent an image quality from being deteriorated.

SUMMARY

According to an aspect of one or more embodiments, there may be provided an image compression apparatus including a processor; an image reduction unit to generate a reduced image with a reduced resolution by sampling an input image, a filter information decision unit to determine filter information based on the input image and the reduced image, and a bitstream generator to generate a bitstream by coding the reduced image and the filter information, wherein at least one of the image reduction unit, the filter information decision unit and the bitstream generator use the processor to perform the generating the reduced image, the determining filter information or the generating the bitstream, respectively.

The filter information decision unit may include an image divider to divide the reduced image into a plurality of blocks, a representative block selector to generate at least one group including blocks having a similar pixel value with respect to the divided blocks, and to select a representative block from blocks included in each of the at least one group, and an interpolation coefficient decision unit to determine an interpolation coefficient with respect to the representative block based on the input image and the reduced image.

The filter information decision unit may include an image divider to divide the reduced image into a plurality of blocks, an interest block selector to select, from the plurality of blocks, an interest block indicating an image that gains an attention of a human visual sense, and an interpolation coefficient decision unit to determine an interpolation coefficient with respect to the interest block based on the input image and the reduced image.

According to another aspect of one or more embodiments, there may be provided an image restoration apparatus including a processor; a filter information extractor to extract filter information from a bitstream received from an image compression apparatus, an image decoder to decode a reduced image included in the bitstream, and an image enlargement unit to increase a resolution of the reduced image based on the filter information, wherein at least one of the filter information extractor, the image decoder and the image enlargement unit use the processor to perform the extracting, the decoding or the increasing, respectively.

The image enlargement unit may include an image divider to divide the reduced image into a plurality of blocks, a block extractor to extract, as a maximum likelihood block, a representative block or an interest block most similar with respect to each of the blocks, and an image interpolator to interpolate the reduced image by setting an interpolation coefficient of each of the blocks to be different based on a comparison result between an error of the maximum likelihood block and a first predetermined threshold.

The image enlargement unit may include an image divider to divide the reduced image into a plurality of blocks, a flag decision unit to determine a type of a flag set in each of the blocks, and an image interpolator to interpolate the reduced image by setting an interpolation coefficient of each of the blocks to be different based on the type of the flag.

According to still another aspect of one or more embodiments, there may be provided an image compression method including generating a reduced image with a reduced resolution by sampling an input image, determining filter information based on the input image and the reduced image, and generating a bitstream by coding the reduced image and the filter information.

According to yet another aspect of one or more embodiments, there may be provided an image restoration method including extracting filter information from a bitstream received from an image compression method, decoding a reduced image included in the bitstream, and increasing a resolution of the reduced image based on the filter information.

According to another aspect of one or more embodiment, there may be provided an image compression method, including: reducing a resolution of an input image to generate a reduced image; determining filter information based on the reduced image and the input image; and transmitting the reduced image and the filter information to an image restoration apparatus.

The filter information may include an interpolation coefficient determined with respect to a block divided from the reduced image.

The block of the reduced image may be one of a representative block having a smaller error with respect to remaining blocks in a group selected from blocks divided from the reduced image, and an interest block in which a variance or a moment of pixels is greater than a predetermined threshold.

The filter information may include a flag indicating whether the block is an interest block or a non-interest block.

According to yet another aspect of one or embodiments, there is provided an image restoration method, including: transmitting a reduced image having a resolution reduced from an input image and filter information determined based on the reduced image and the input image to an image restoration apparatus; receiving the reduced image and the filter information; and increasing the resolution of the reduced image based on the received filter information.

According to at least one embodiment, it is possible to decrease a deterioration in an image quality, and to reduce an amount of bits even in a limited bandwidth.

According to at least one embodiment, it is possible to prevent an unnecessary bit from occurring by accumulating and reusing a filter set table Additional aspects, features, and/or advantages of exemplary embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the exemplary embodiments, taken in conjunction with the accompanying drawings of which:

FIG. 4 illustrates a process of determining an interpolation coefficient according to at least one embodiment;

DETAILED DESCRIPTION

Figure 1:
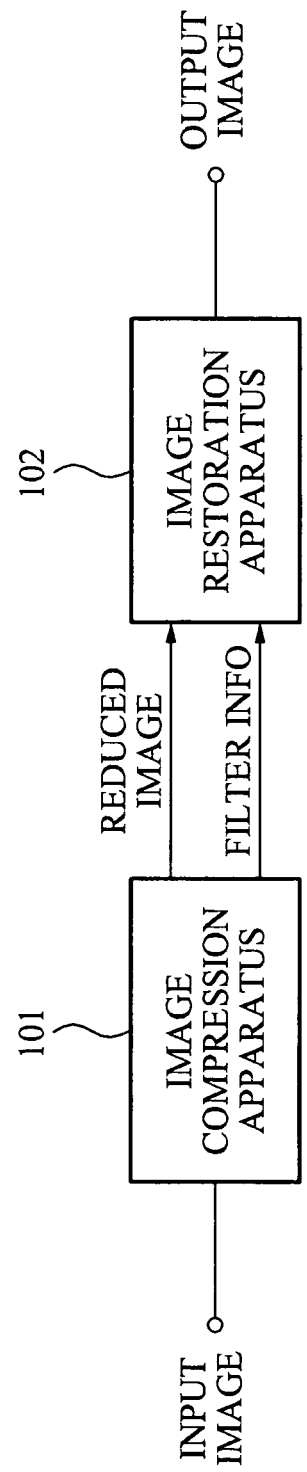
FIG. 1 illustrates a block diagram to describe an operation of an image compression apparatus and an image restoration apparatus according to at least one embodiment.

Reference will now be made in detail to at least one embodiment, examples of which are illustrated in the accompanying drawings, wherein like reference numerals refer to the like elements throughout. At least one exemplary embodiment is described below to explain the present disclosure by referring to the figures.

FIG. 1 illustrates a block diagram to describe an operation of an image compression apparatus 101 and an image restoration apparatus 102 according to at least one embodiment.

Generally, a wide bandwidth may be used to transmit a high resolution video. Accordingly, to transmit the high resolution video using a limited bandwidth, disclosed is a scheme that may transform the high resolution video to a low definition video and transmit the transformed low definition video.

The image compression apparatus 101 may reduce a resolution of an image input via a limited bandwidth, and may transmit the reduced image to the image restoration apparatus 102. To prevent a deterioration in an image quality occurring when the image restoration apparatus 102 increases a resolution of the reduced image, the image compression apparatus 101 may additionally transmit filter information for the resolution increase to the image restoration apparatus 102.

Figure 2:
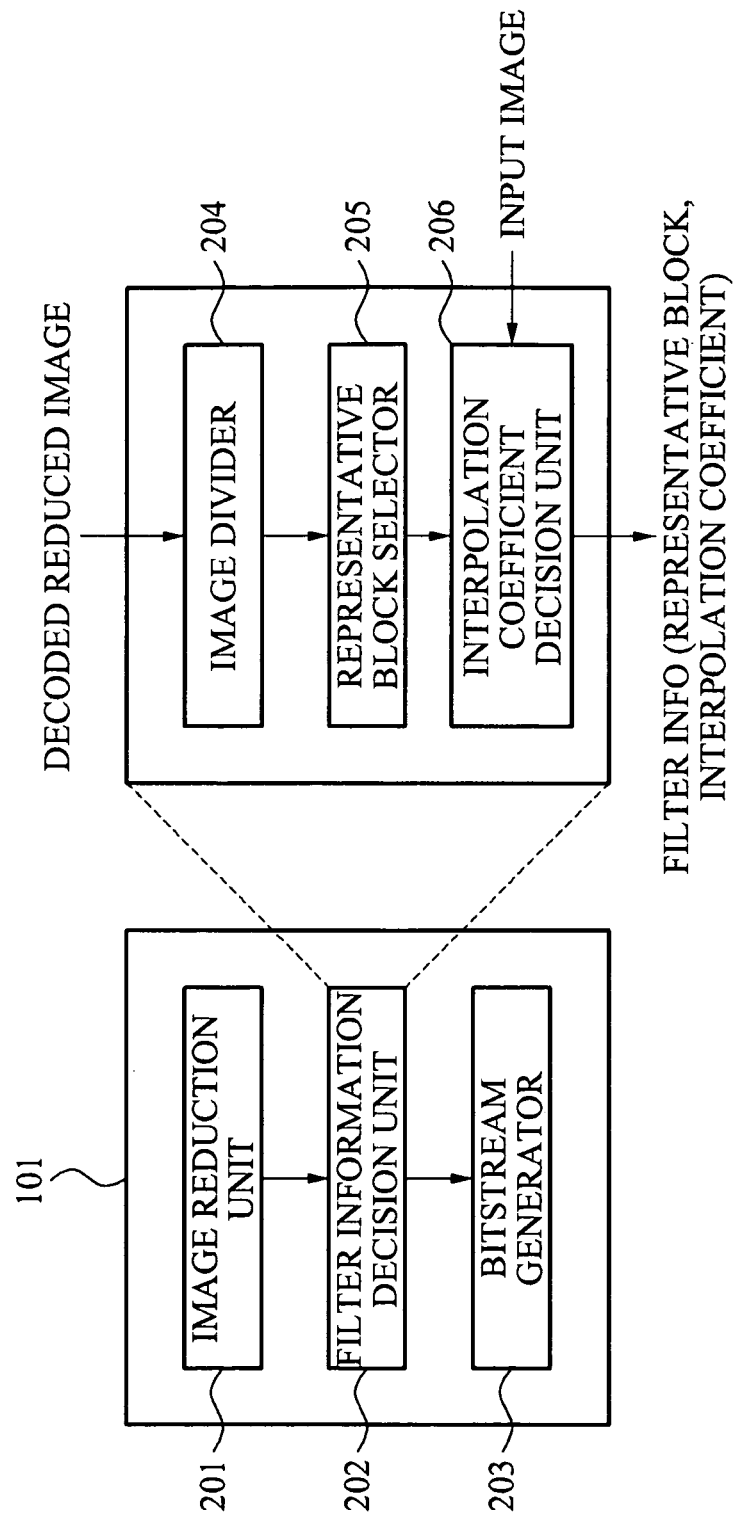
FIG. 2 illustrates a configuration of the image compression apparatus of FIG. 1 according to at least one embodiment.

FIG. 2 illustrates a configuration of the image compression apparatus 101 of FIG. 1 according to at least one embodiment.

Referring to FIG. 2, the image compression apparatus 101 may include an image reduction unit 201, a filter information decision unit 202, and a bitstream generator 203.

The image reduction unit 201 may generate a reduced image with a reduced resolution by sampling an input image. For example, when a single pixel per every two pixels is sampled with respect to a vertical direction and a horizontal direction in the input image, the image reduction unit 201 may generate the reduced image of which the resolution is reduced to ½. The above sampling scheme may vary depending on a system configuration.

The filter information decision unit 202 may determine filter information based on the input image and a decoded reduced image. To determine the filter information, the reduced image may be encoded and then decoded. For example, the reduced image may be encoded using motion picture experts group (MPEG)-1/24 or H.261/263/264, for example.

The filter information decision unit 202 may include an image divider 204, a representative block selector 205, and an interpolation coefficient decision unit 206.

The image divider 204 may divide the decoded reduced image into a plurality of blocks.

The representative block selector 205 may generate at least one group including blocks having a similar pixel value with respect to the divided blocks, and select a representative block from blocks included in each of the at least one group. Here, the pixel value denotes a gray level of a block. For example, the representative block selector 205 may select, as the representative block, a block having a smallest error with respect to remaining blocks based on blocks included in each of the at least one group. The representative block selector 205 may select the representative block by calculating an error between blocks using a mean square error scheme, for example. The representative block selector 205 may select the representative block by transforming a clustering scheme, such as a K-means scheme or a mean shift scheme.

The interpolation coefficient decision unit 206 may determine an interpolation coefficient with respect to the representative block based on the input image and the decoded reduced image. For example, the interpolation coefficient decision unit 206 may determine the interpolation coefficient with respect to the representative block by determining the interpolation coefficient minimizing an error between the input image and a result image obtained by applying the interpolation coefficient to the decoded reduced image. The interpolation coefficient may be generated into a filter set table with respect to the representative block.

When a single pixel per every two pixels is sampled with respect to a vertical direction and a horizontal direction, a reduced image in which a resolution of the input image is reduced to ½, for example, a number of pixels is reduced to ¼, may be generated. When interpolating and enlarging the reduced image later, three types of interpolation coefficients may be used to interpolate pixels with respect to the vertical direction, the horizontal direction, and a diagonal direction. The interpolation coefficient will be further described with reference to FIG. 4. The representative block and the interpolation coefficient may be determined based on filter information.

The bitstream generator 203 may generate a bitstream by coding the reduced image and the filter information. The generated bitstream may be transmitted to the image restoration apparatus 102.

Figure 3:
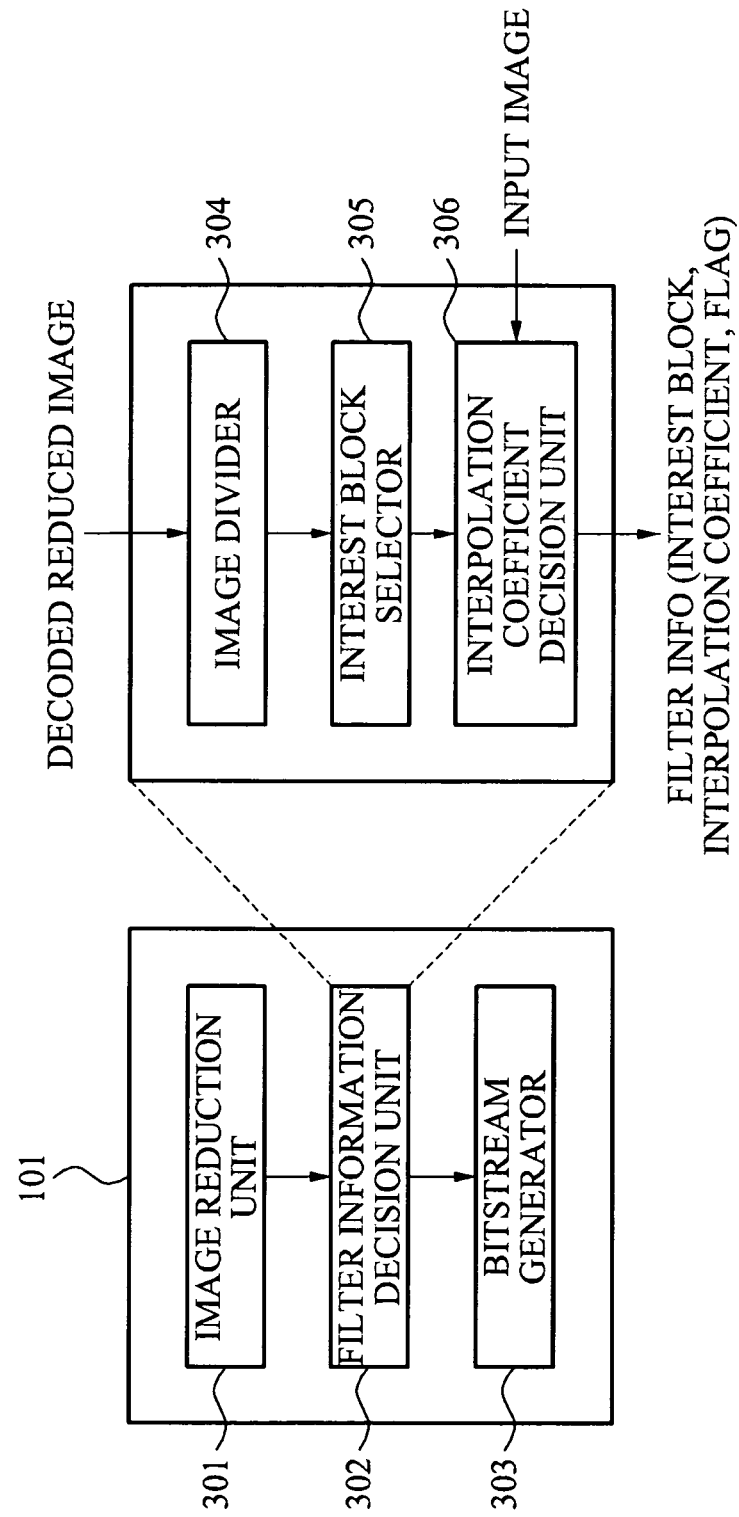
FIG. 3 illustrates a configuration of the image compression apparatus of FIG. 1 according to at least one embodiment.

FIG. 3 illustrates a configuration of the image compression apparatus 101 of FIG. 1 according to at least one embodiment.

Referring to FIG. 3, an interest block may be selected, which is different from FIG. 2. An image reduction unit 301, a filter information decision unit 302, a bitstream generator 303, and an image divider 304 of FIG. 3 correspond to the image reduction unit 201, the filter information decision unit 202, the bitstream generator 203, and the image divider 204 of FIG. 2, and thus further detailed description related thereto will be omitted here.

An interest block selector 305 may select, from the plurality of blocks, an interest block indicating an image that gains an attention of a human visual sense. For example, the interest block selector 305 may select, as the interest block from the plurality of blocks, a block where a variance or a moment of pixels is greater than a predetermined threshold. Blocks unselected as the interest block from the plurality of blocks may be selected as non-interest blocks. Generally, a block corresponding to a texture region, an edge region, or a foreground in the input image may be selected as an interest block. A block corresponding to a smooth region or a background may be selected as a non-interest block.

The interest block selector 305 may select the interest block from the plurality of blocks to set a flag in the selected interest block. For example, the interest block selector 305 may set the fag to "1" with respect to the interest block, and may set the flag to "0" with respect to the non-interest block. The interest block selector 305 may set the flag with respect to all the blocks constituting the reduced image.

An interpolation coefficient decision unit 306 may determine an interpolation coefficient with respect to the interest block based on the input image and the decoded reduced image. For example, the interpolation coefficient decision unit 306 may determine the interpolation coefficient with respect to the interest block by determining the interpolation coefficient minimizing an error between the input image and a result image obtained by applying the interpolation coefficient to the decoded reduced image. The interpolation coefficient may be generated into a filter set table with respect to the interest block. The filter information may include the interest block and the interpolation coefficient. When the flag is set with respect to the interest block, the filter information may include the interest block, the interpolation coefficient, and the flag.

FIG. 4 illustrates a process of determining an interpolation coefficient according to at least one embodiment.

The image compression apparatus 101 may divide a decoded reduced image 401 into a plurality of blocks. The image compression apparatus 101 may select a representative block or an interest block from the plurality of blocks.

The image compression apparatus 101 may generate at least one group including blocks having a similar pixel value with respect to the divided blocks, and select the representative block from blocks included in each of the at least one group. Specifically, the image compression apparatus 101 may select, as the representative block, a block having a smallest error with respect to remaining blocks based on blocks included in each of the at least one group.

The image compression apparatus 101 may select, from the plurality of blocks, the interest block indicating an image that gains an attention of a human visual sense. For example, the image compression apparatus 101 may select, as the interest block from the plurality of blocks, a block where a variance or a moment of pixels is greater than a predetermined threshold. A block unselected as the interest block from the plurality of blocks may be selected as a non-interest block.

The image compression apparatus 101 may determine an interpolation coefficient with respect to the selected representative block or the interest block. For example, the image compression apparatus 101 may determine an interpolation coefficient minimizing an error between an input image and the decoded reduced image 401 with respect to the representative block or the interest block. When the image restoration apparatus 102 generates an enlarged image by interpolating the decoded reduced image 401 according to the determined interpolation coefficient, an error between the input image and the enlarged image may be minimized.

Since the interpolation coefficient is determined for each block, an amount of bits may increase according to a number of blocks. For example, when the interpolation coefficient is determined with respect to a reduced image having a resolution, of 704×576 by dividing the reduced image based on a 4×4 block unit, 16 interpolation coefficients with respect to each of a diagonal direction, a vertical direction, and a horizontal direction may be generated. However, when the interpolation coefficient is determined with respect to the reduced image having the resolution of 704×576 by dividing the reduced image based on a 32×32 block unit, a total of 4752 interpolation coefficients may be generated. Since a number of interpolation coefficients increases according to an increase in a number of pixels included in the divided blocks, a size of a file to be transmitted to the image restoration apparatus 102 may increase.

According to at least one embodiment, the image compression apparatus 101 may generate the interpolation coefficient using a filter set table scheme. For example, when the reduced image having the resolution of 704×576 is divided based on the 32×32 block unit, 99 blocks may be obtained. The image compression apparatus 101 may cluster 99 blocks into 16 groups and select a representative block from blocks included in each of the 16 groups, and thereby determine an interpolation coefficient only with respect to the representative block. There is no particular constraint on the number of groups. Also, the image compression apparatus 101 may select, as an interest block from the 99 blocks, a block where a predetermined variance or a moment is greater than a predetermined threshold, and thereby determine the interpolation coefficient with respect to the interest block. In this case, since a number of interpolation coefficients to be generated decreases, a size of a file to be transmitted to the image restoration apparatus 102 may decrease.

For example, the image compression apparatus 101 may determine the interpolation coefficient with respect to the representative block or the interest block according to the following Equation 1:

For each subpel position [Equation 1]

(diagonal position, vertical position, horizontal position)

$$0 = \sum_{x}\sum_{y}\left(S_{x,y} - \sum_{i=1}^{6}\sum_{j=1}^{6}h_{i,j}^{SP}R_{x+i,y+j}\right)R_{x+k,y+l}$$

$$\forall k, l \in \{0, 1, 2, 3, 4, 5\},$$

where S is the original image and R is the reduced decoded image.

x, y are the indexes of image coordinate.

In Equation 1, S denotes the input image and R denotes a decoded reduced image. According to Equation 1, it is possible to determine the interpolation coefficient minimizing the error between the input image and a result image obtained by applying the interpolation coefficient h to the decoded reduced image. The error may indicate a mean square error. The interpolation coefficient may have a value that is in proportion to a number of pixels included in the input image and in inverse proportion to a number of pixels included in the decoded reduced image. The interpolation coefficient may be recursively determined with respect to all the pixels included in the representative block or the interest block.

In Equation 1, the interpolation coefficient may indicate a root of a linear simultaneous equation. The interpolation coefficient may be calculated using a Gaussian elimination and the like. Since the interpolation coefficient is determined based on a block unit instead of the entire reduced image, a peak signal-to-noise ratio (PSNR) may increase and an image quality may be enhanced.

Figure 5:
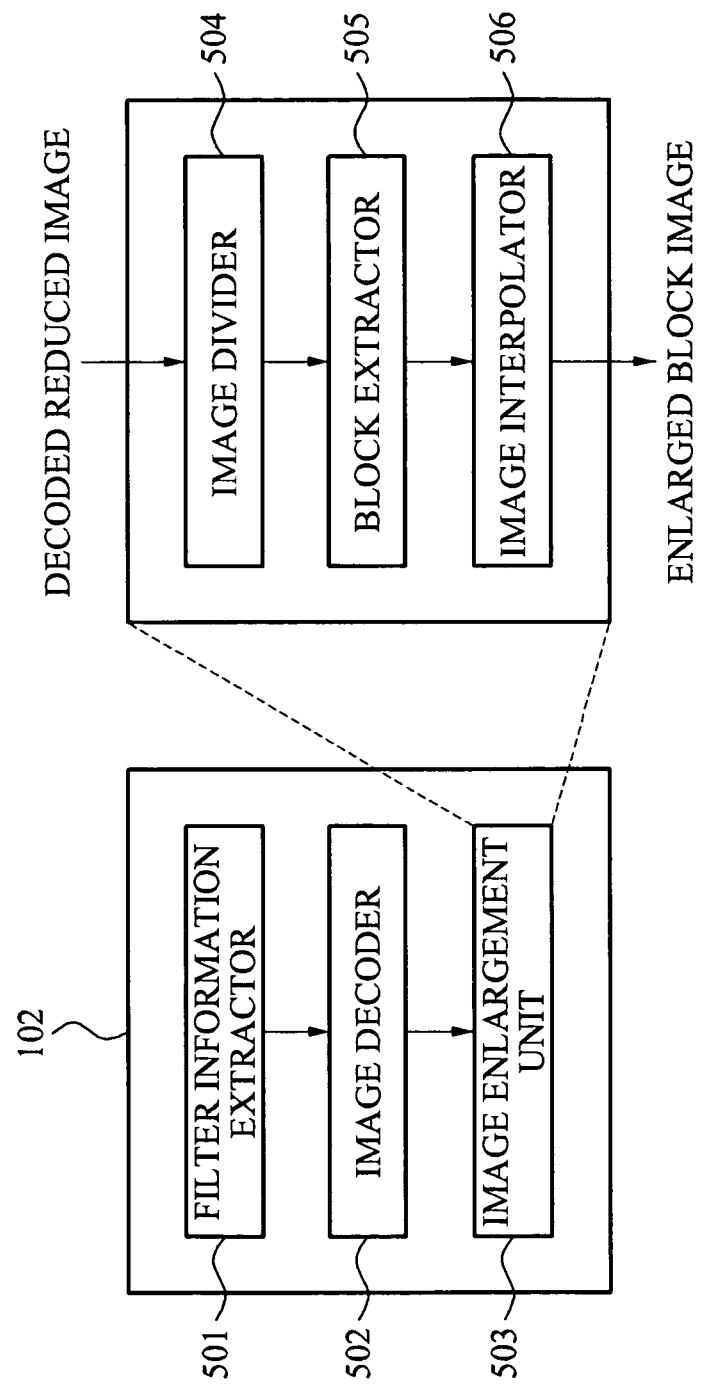
FIG. 5 illustrates a configuration of the image restoration apparatus of FIG. 1 according to at least one embodiment.

FIG. 5 illustrates a configuration of the image restoration apparatus 102 of FIG. 1 according to an embodiment.

Referring to FIG. 5, the image restoration apparatus 102 may include a filter information extractor 501, an image decoder 502, and an image enlargement unit 503.

The filter information extractor 501 may extract filter information from a bitstream received from the image compression apparatus 101. As described above with reference to FIGS. 2 and 3, the filter information may include a representative block and an interpolation coefficient, or may include an interest block, the interpolation coefficient, and a flag.

The image decoder 502 may decode a reduced image included in the bitstream.

The image enlargement unit 503 may increase a resolution of the decoded reduced image based on the filter information. The image enlargement unit 503 may include an image divider 504, a block extractor 505, and an image interpolator 506. When a representative block or an interest block without a set flag is included in the filter information, the image enlargement unit 503 may be applicable.

The image divider 504 may divide the decoded reduced image into a plurality of blocks.

The block extractor 505 may extract, as a maximum likelihood block, a representative block or an interest block most similar with respect to each of the blocks. Here, the representative block indicates a block having a smallest error with respect to remaining blocks based on blocks having a similar pixel value and constituting a group, and the interest block indicates a block where a variance or a moment of pixels is greater than a predetermined threshold among a plurality of blocks constituting the reduced image.

The image interpolator 506 may interpolate the decoded reduced image by setting an interpolation coefficient of each of the blocks to be different based on a comparison result between an error of the maximum likelihood block and a predetermined threshold. The image interpolator 506 may select the interpolation coefficient by reusing a filter set table included in the filter information with respect to at least one picture group constituting the reduced image. The image interpolator 506 may determine the interpolation coefficient with respect to an intra picture that is a first picture of each of the at least one picture group, and may select the interpolation coefficient by accumulating a new filter set table for each picture group with respect to pictures subsequent to the first picture.

Figure 6:
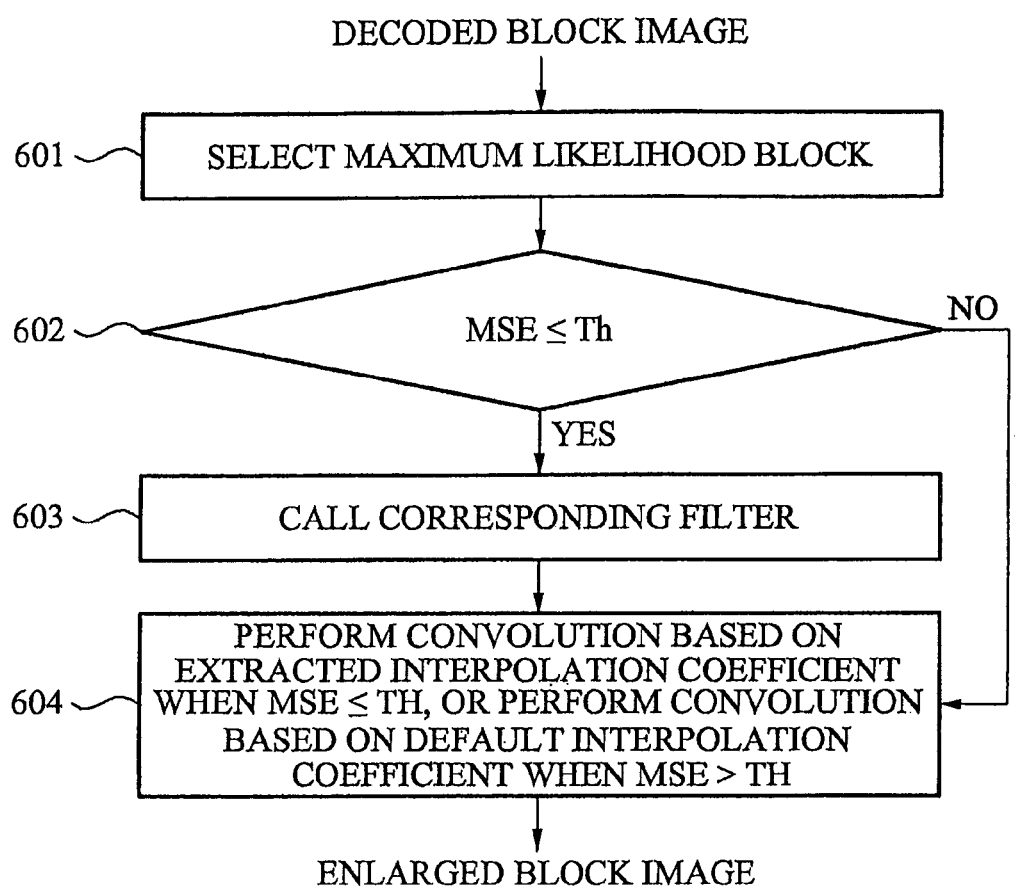
FIG. 6 illustrates an operation of the image enlargement unit of FIG. 5 according to at least one embodiment.

FIG. 6 illustrates an operation of the image enlargement unit 503 of FIG. 5 according to at least one embodiment.

In operation 601, the image enlargement unit 503 may select, as a maximum likelihood block, a representative block or an interest block most similar with respect to a decoded block image. The decoded block image may be obtained by dividing a decoded reduced image into a plurality of blocks.

In operation 602, the image enlargement unit 503 may compare an error of the maximum likelihood block with a predetermined threshold. The error of the maximum likelihood block may be calculated using a mean square error, a sum of absolute difference (SAD), and a sum of squared difference (SSD).

When the error of the maximum likelihood block is less than or equal to the predetermined threshold, the image enlargement unit 503 may extract an interpolation coefficient corresponding to the maximum likelihood block from a filter set table included in filter information in operation 603. Specifically, the image enlargement unit 503 may call, from the filter set table, a filter corresponding to the maximum likelihood block.

In operation 604, the image enlargement unit 503 may perform interpolation by performing convolution with respect to each of blocks included in the reduced image, based on the extracted interpolation coefficient. Accordingly, an enlarged block image may be obtained.

Conversely, when the error of the maximum likelihood block is greater than the predetermined threshold in operation 602, the image enlargement unit 503 may perform interpolation by performing convolution with respect to each of the blocks based on a default interpolation coefficient in operation 604. The default interpolation coefficient may include a 6-tab interpolation coefficient or a bicubic interpolation coefficient. The process of FIG. 6 may be applicable alike to all the blocks constituting a single picture. By applying the default interpolation coefficient to an abnormal block having a great difference with an actual input image, it is possible to prevent a significant deterioration in an image quality.

Figure 7:
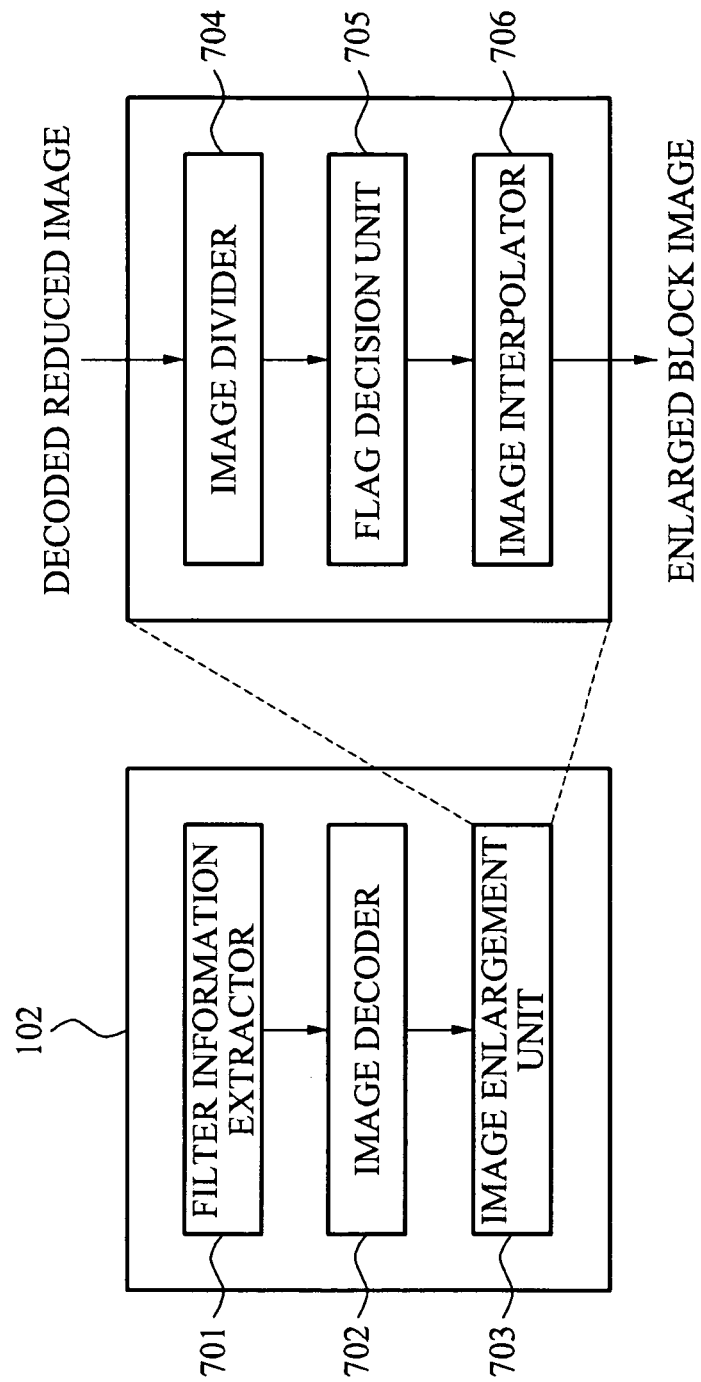
FIG. 7 illustrates a configuration of the image restoration apparatus of FIG. 1 according to at least one embodiment.

FIG. 7 illustrates a configuration of the image restoration apparatus 102 of FIG. 1 according to at least one embodiment.

Referring to FIG. 7, the image restoration apparatus 102 may include a filter information extractor 701, an image decoder 702, and an image enlargement unit 703. The filter information extractor 701, the image decoder 702, and the image enlargement unit 703 of FIG. 7 correspond to the filter information extractor 501, the image decoder 502, and the image enlargement unit 503 of FIG. 5, and thus further detailed description related thereto will be omitted here. When an interest block with a set flag is included in filter information, the image restoration apparatus 102 of FIG. 7 may be applicable.

An image divider 704 may divide a decoded reduced image into a plurality of blocks.

A flag decision unit 705 may determine a type of a flag set in each of the blocks. The flag indicates whether a corresponding block is an interest block or a non-interest block. The flag may be included in filter information extracted by the filter information extractor 701. An image interpolator 706 may interpolate the decoded reduced image by setting an interpolation coefficient of each of the blocks to be different based on the type of the flag. An operation of the image interpolator 706 will be further described with reference to FIG. 8.

Figure 8:
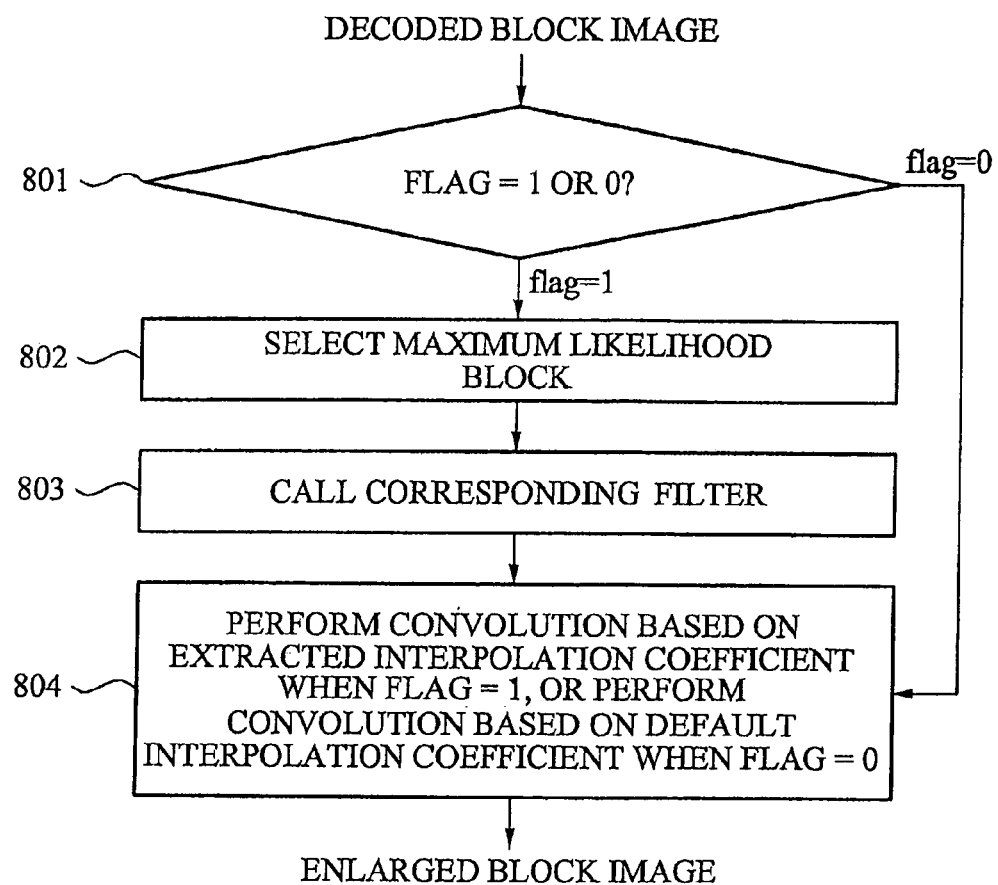
FIG. 8 illustrates an operation of an image enlargement unit of FIG. 7 according to at least one embodiment.

FIG. 8 illustrates an operation of the image enlargement unit 703 of FIG. 7 according to at least one embodiment.

In operation 801, the image enlargement unit 703 may determine a type of a flag to be set in each of decoded blocks, that is, may determine whether flag=1 or 0. The decoded blocks may be generated by dividing a decoded reduced image into a plurality of blocks.

When the flag indicates an interest block, that is, when flag=1, the image enlargement unit 703 may select, as a maximum likelihood block, an interest block most similar with respect to each of the blocks in operation 802. In operation 803, the image enlargement unit 703 may extract an interpolation coefficient corresponding to the maximum likelihood block from a filter set table included in the filter information. Specifically, the image enlargement unit 703 may call, from the filter set table, a filter corresponding to the maximum likelihood block. In operation 804, the image enlargement unit 703 may perform interpolation by performing convolution with respect to each of the blocks based on the extracted interpolation coefficient. Consequently, an enlarged block image may be obtained.

When the flag indicates a non-interest block, that is, when flag=0 in operation 802, the image enlargement unit 703 may perform interpolation by performing convolution with respect to each of the blocks based on a default interpolation coefficient in operation 804. The default interpolation coefficient may include a 6-tab interpolation coefficient or a bicubic interpolation coefficient. The operation of FIG. 8 may be applicable alike to all the blocks constituting a single picture. By applying the default interpolation coefficient to an abnormal block having a great difference with respect to an actual input image, it is possible to prevent a significant deterioration in an image quality.

Figure 9:
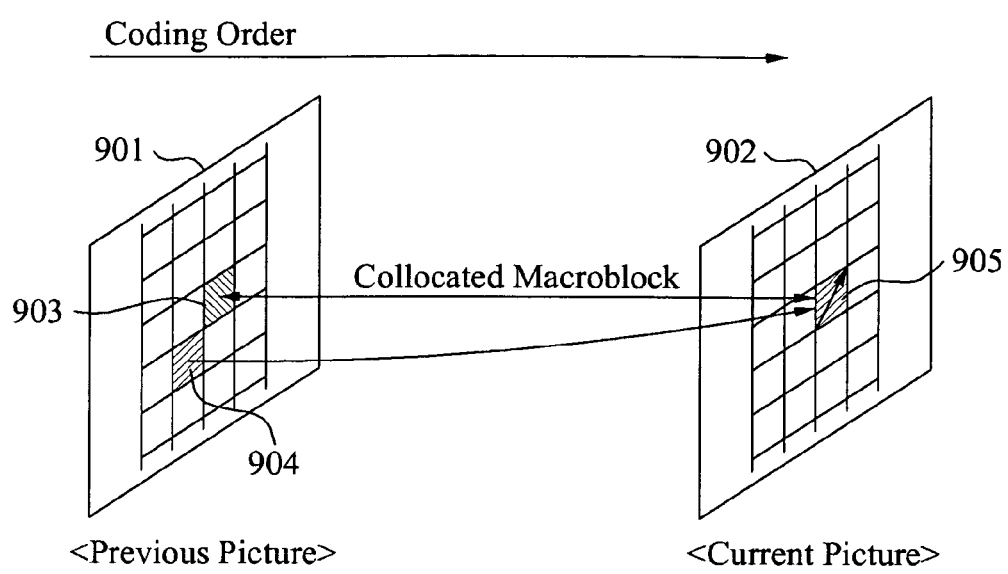
FIG. 9 illustrates a process of reusing an interpolation coefficient according to at least one embodiment.

FIG. 9 illustrates a process of reusing an interpolation coefficient according to at least one embodiment.

Pictures may have a similar characteristic with respect to the same scene. Accordingly, the image restoration apparatus 102 may select only an interpolation coefficient with respect to an intra picture that is a first picture of each of at least one picture group constituting a reduced image. The image restoration apparatus 102 may reuse the interpolation coefficient of the first picture with respect to pictures subsequent to the first picture. A P-picture or a B-picture after the first picture may include a motion vector or a prediction mode.

The motion vector and the prediction may indicate a macro block 903 of a previous picture 901. When an error between a block image including the macro block 903 of the previous picture 901 and a block 905 of a current picture 902 is less than or equal to a predetermined threshold, an interpolation coefficient of the block image of the previous picture 901 may be used as an interpolation coefficient of the current picture 902. Since the interpolation coefficient may be reused, it is possible to decrease an amount of bits.

Figure 10:
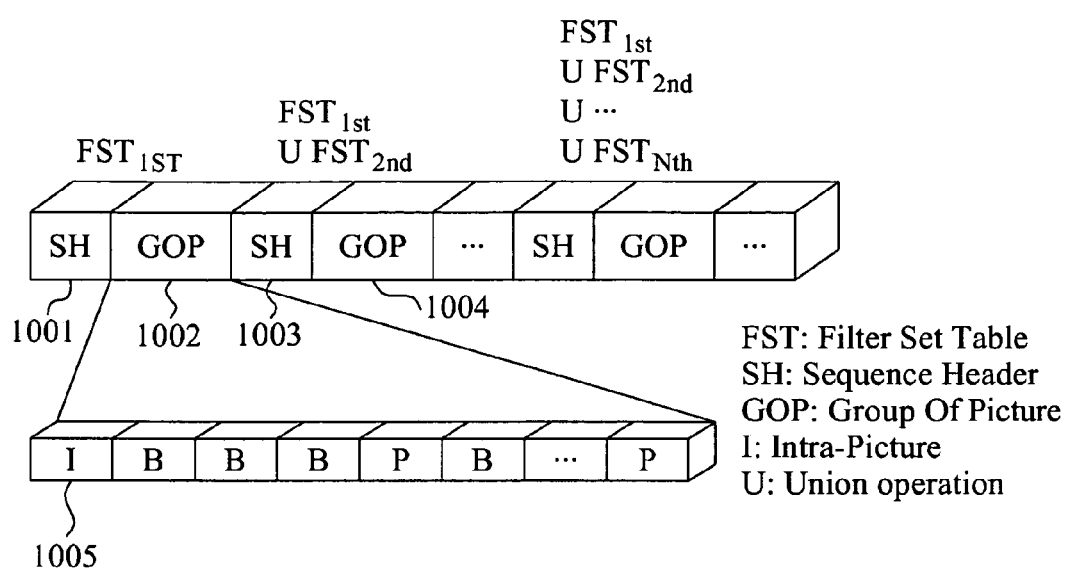
FIG. 10 illustrates a scheme of accumulating filter information according to at least one embodiment.

FIG. 10 illustrates a scheme of accumulating filter information according to an embodiment.

FIG. 10 also illustrates a scheme of accumulating and using a filter set table included in filter information. A size of a filter set table used to enlarge a reduced image may be expanded by adding a newly-transmitted filter set table. The newly-transmitted filter set table may include blocks having a low correlation with respect to a representative block of a previous filter set table. When the size of the filter set table is increasingly expanded to exceed a predetermined size, representative blocks may be removed in an order of a least called representative block. Accordingly, it is possible to prevent the size of the filter set table from indefinitely increasing.

The image compression apparatus 101 may additionally transmit an interpolation coefficient to sequence heads SH 1001 and 1003. A basic compression unit of an image is a group of pictures (GOP). The GOP includes a plurality of P-pictures and a plurality of B-pictures, starting from an intra (I)-picture. In FIG. 10, an I-picture 1005 indicates an image directly compressed from an input image. The P-picture and the B-picture indicate pictures containing only information associated with a transformed portion, that is, a moved portion based on the I-picture 1005. When filter information with respect to the I-picture 1005 that is a first picture within GOPs 1002 and 1004 is determined, the filter information of the I-picture 1005 may be reused instead of determining new filter information. The determined filter information may be entropy coded and thereby be transmitted to the image restoration apparatus 102 using the sequence headers SH 1001 and 1003.

To restore the I-picture 1005 that is the first picture in the GOP 1002, the image restoration apparatus 102 may determine an interpolation coefficient based on a filter set table $FST_{1st}$ included in the sequence header SH 1001. Next, to restore the I-picture that is the first picture in the GOP 1004, the image restoration apparatus 102 may reuse the filter set table $FST_{1st}$ included in the sequence header SH 1001. The image restoration apparatus 102 may accumulate the filter set table $FST_{1st}$ included in the sequence header SH 1001, and a filter set table $FST_{2nd}$ included in the sequence header SH 1003. The above process may be continuously repeated. When a size of accumulated filter set tables $(FST_{1st} \cup FST_{2nd} \cup \ldots \cup FST_{Nth})$ exceeds a predetermined size, it is possible to remove a filter set table of a least called representative block.

Figure 11:
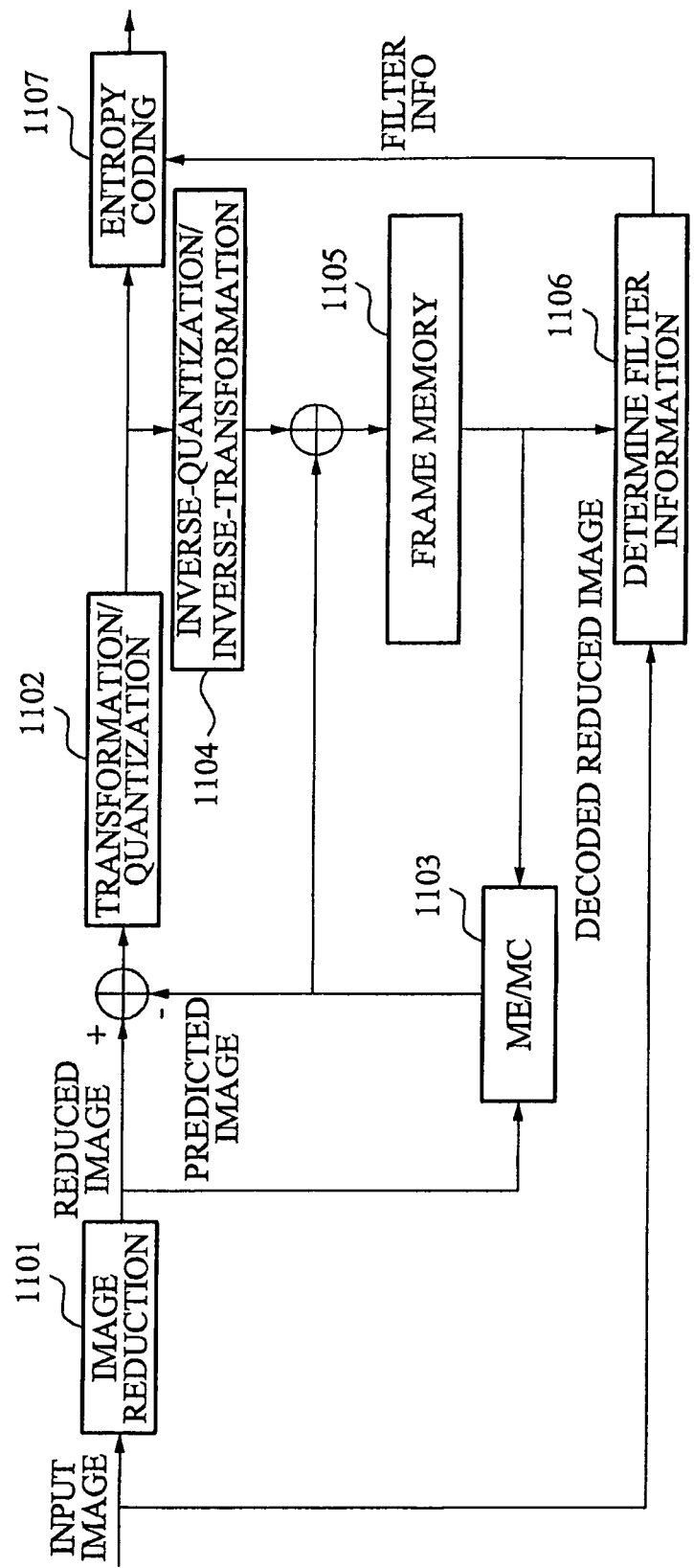
FIG. 11 illustrates an operation of an image compression apparatus according to at least one embodiment.

FIG. 11 illustrates an operation of the image compression apparatus 101 of FIG. 1 according to an embodiment.

The image compression apparatus 101 may reduce an image by sampling an input image (1101). In this instance, the image compression apparatus 101 may generate a reduced image with a reduced resolution compared to the input image. The reduced image may be encoded through transformation/quantization 1102 and then be decoded through inverse-quantization/inverse-transformation 1104. A decoded reduced image may be stored in a frame memory 1105. The reduced image may be encoded based on a prediction image generated from a reduced image decoded in a previous picture through motion estimation/motion compensation ME/MC 1103.

The image compression apparatus 101 may extract a representative block or an interest block from the decoded reduced image (1106). Also, the image compression apparatus 101 may determine an interpolation coefficient of the representative block or the interest block minimizing an error between the input image and a result image obtained by applying the interpolation coefficient to the decoded reduced image (1106). A flag may be set in the interest block. In this case, the representative block, the interest block, the interpolation coefficient, and the flag may be included in filter information. The image compression apparatus 101 may generate a bitstream by performing entropy coding based on the filter information and the decoded reduced image (1107).

Figure 12:
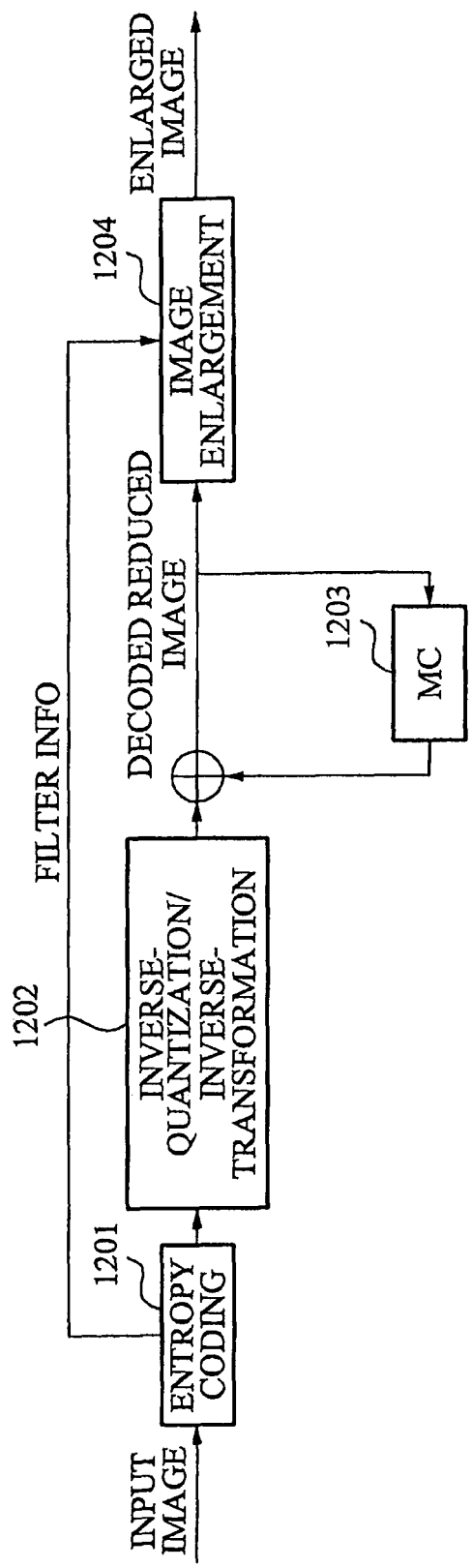
FIG. 12 illustrates an operation of an image restoration apparatus according to at least one embodiment.

FIG. 12 illustrates an operation of the image restoration apparatus 102 of FIG. 1 according to at least one embodiment.

The image restoration apparatus 102 may extract an encoded reduced image and filter information by entropy coding a bitstream (1201). The image restoration apparatus 102 may decode the encoded reduced image by performing inverse-quantization/inverse-transformation for the encoded reduced image (1202). The decoded reduced image may be fed back through motion compensation MC 1203. The image restoration apparatus 102 may enlarge the decoded reduced image by interpolating the decoded reduced image based on the filter information (1204).

Matters not described above with reference to FIGS. 11 and 12 may refer to the descriptions made above with reference to FIGS. 1 through 10.

The image compression/restoration method according to the above-described at least one exemplary embodiment may be recorded in computer-readable media including program instructions to implement various operations embodied by a computer. The media may also include, alone or in combination with the program instructions, data files, data structures, and the like. Examples of computer-readable media include magnetic media, such as hard disks, floppy disks, and magnetic tape; optical media, such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa. If the described hardware devices are configured to act as one or more software modules, then the software modules use a processor to execute their respective operations.

Although at least one exemplary embodiment has been shown and described, it would be appreciated by those skilled in the art that changes may be made in this at least one embodiment without departing from the principles and spirit of the disclosure, the scope of which is defined by the claims and their equivalents.

What is claimed is:

1. An image compression apparatus, comprising:
    an image reduction unit to generate a reduced image with a reduced resolution by sampling an input image;
    a filter information decision unit to determine filter information including at least one interpolation coefficient based on the input image and the reduced image, which comprises:
        an image divider to divide the reduced image into a plurality of blocks;
        a representative block selector to calculate pixel value errors between the plurality of blocks, and select, as a representative block, one block, which is one of the plurality of blocks and has the smallest pixel value error; and
        an interpolation coefficient decision unit to determine an interpolation coefficient with respect to the representative block based on the input image and the reduced image,
        wherein the interpolation coefficient decision unit generates a filter set table with respect to the representative block by determining the interpolation coefficient minimizing an error between the input image and a result image obtained by applying the interpolation coefficient to the reduced image; and
    a bitstream generator to generate a bitstream by coding the reduced image and the determined filter information.

2. The image compression apparatus according to claim 1, wherein the representative block selector generates at least one group including blocks having a similar pixel value with respect to the divided blocks, and selects a representative block from blocks included in each of the at least one group.

3. The image compression apparatus according to claim 2, wherein the representative block selector selects, as the representative block, a block having a smallest pixel value error with respect to remaining blocks based on blocks included in each of the at least one group.

4. An image restoration apparatus, comprising:
    a filter information extractor to extract filter information from a bitstream received from an image compression apparatus, wherein the filter information including at least one interpolation coefficient;
    an image decoder to decode a reduced image included in the bitstream; and
    an image enlargement unit to increase a resolution of the decoded reduced image based on the filter information, which comprises:
        an image divider to divide the reduced image into a plurality of blocks;
        a block extractor to extract, as a maximum likelihood block, a representative block or an interest block most similar with respect to each of the blocks; and
        an image interpolator to interpolate the decoded reduced image based on a comparison result between an error of the maximum likelihood block and a first predetermined threshold,
    wherein the image interpolator interpolates each of the blocked by extracting an interpolation coefficient corresponding to the maximum likelihood block from a filter set table with respect to the representative block included in the filter information in response to the error of the maximum likelihood block being less than or equal to the first predetermined threshold,
    wherein the image interpolator interpolates each of the blocks according to a default interpolation coefficient in response to the error of the maximum likelihood block being greater than the first predetermined threshold, and
    wherein
    the representative block indicates a block which was selected by comparing an error with respect to remaining blocks based on blocks having a similar pixel value, and the interest block indicates a block selected based on a variance or a moment of pixels among a plurality of blocks constituting the reduced image.

5. The image restoration apparatus according to claim 4, wherein the image interpolator interpolates the decoded reduced image by setting an interpolation coefficient of each of the blocks to be different based on the comparison result.

6. The image restoration apparatus according to claim 4, wherein:
    the representative block indicates a block having a smallest error with respect to remaining blocks based on blocks having a similar pixel value and constituting a group, and
    the interest block indicates a block where the variance or the moment of pixels is greater than a second predetermined threshold among a plurality of blocks constituting the reduced image.

7. The image restoration apparatus according to claim 4, wherein the image interpolator selects the interpolation coefficient by reusing a filter set table included in the filter information with respect to at least one picture group constituting the reduced image.

8. The image restoration apparatus according to claim 7, wherein the image interpolator determines the interpolation coefficient with respect to an intra picture that is a first picture of each of the at least one picture group, and selects the interpolation coefficient by accumulating a new filter set table for each picture group with respect to pictures subsequent to the first picture.

9. An image compression method, comprising:
    generating a reduced image with a reduced resolution by sampling an input image;
    determining filter information including at least one interpolation coefficient based on the input image and the reduced image, which comprises:
        dividing the reduced image into a plurality of blocks;
        calculating pixel value errors between the plurality of blocks;
        selecting, as a representative block, one block from the plurality of blocks and has the smallest pixel value error; and
        determining an interpolation coefficient with respect to the representative block based on the input image and the reduced image, wherein the determining of the interpolation coefficient comprises generating a filter set table with respect to the representative block by determining the interpolation coefficient minimizing an error between the input image and a result image obtained by applying the interpolation coefficient to the reduced image; and generating a bitstream by coding the reduced image and the filter information.

10. The image compression method according to claim 9, wherein the selecting the representative block comprises:

generating at least one group including blocks having a similar pixel value with respect to the divided blocks; and selecting a representative block from blocks included in each of the at least one group.

11. The image compression method according to claim 9, wherein the selecting of the representative group comprises selecting, as the representative block, a block having a smallest pixel value error with respect to remaining blocks based on blocks included in each of the at least one group.

12. An image restoration method, comprising:

extracting filter information from a bitstream received from an image compression apparatus, wherein the filter information including at least one interpolation coefficient;

decoding a reduced image included in the bitstream; and increasing a resolution of the decoded reduced image based on the extracted filter information, which comprises:

dividing the decoded reduced image into a plurality of blocks;

extracting, as a maximum likelihood block, a representative block or an interest block most similar with respect to each of the blocks; and interpolating the reduced image based on a comparison result between an error of the maximum likelihood block and a first predetermined threshold, wherein the interpolating of the reduced image comprises interpolating each of the blocks by extracting an interpolation coefficient corresponding to the maximum likelihood block from a filter set table with respect to the representative block included in the filter information in response to the error of the maximum likelihood block being less than or equal to the first predetermined threshold, and interpolating each of the blocks according to a default interpolation coefficient in response to the error of the maximum likelihood block being greater than the first predetermined threshold, and wherein the representative block indicates a block which was selected by comparing an error with respect to remaining blocks based on blocks having a similar pixel value, and the interest block indicates a block selected based on a variance or a moment of pixels among a plurality of blocks constituting the reduced image.

13. The image restoration method according to claim 12, wherein the interpolating the reduced image comprises interpolating the reduced image by setting an interpolation coefficient of each of the blocks to be different based on the comparison result.

14. The image restoration method according to claim 12, wherein:

the representative block indicates a block having a smallest error with respect to remaining blocks based on blocks having a similar pixel value and constituting a group, and the interest block indicates a block where the variance or the moment of pixels is greater than a second predetermined threshold among a plurality of blocks constituting the reduced image.

* * * * *